(No Model.) 6 Sheets—Sheet 1.

H. COOK.
CASH REGISTER AND INDICATOR.

No. 483,511. Patented Sept. 27, 1892.

Fig. 1.

Witnesses:
W. C. Jirdinston
E. W. Hardingham

Inventor:
Hugo Cook
by Peck & Rector
his Attorneys.

(No Model.) 6 Sheets—Sheet 4.

H. COOK.
CASH REGISTER AND INDICATOR.

No. 483,511. Patented Sept. 27, 1892.

Fig. 4.

Witnesses:
W. C. Jirdinston.

Inventor:
Hugo Cook
by Peck & Recta
his Attorneys.

(No Model.) 6 Sheets—Sheet 5.

H. COOK.
CASH REGISTER AND INDICATOR.

No. 483,511. Patented Sept. 27, 1892.

Witnesses:
W. C. Jirdinston.
E. W. Hardinghaus

Inventor:
Hugo Cook
by Peck r Recter
his Attorneys.

(No Model.) 6 Sheets—Sheet 6.

H. COOK.
CASH REGISTER AND INDICATOR.

No. 483,511. Patented Sept. 27, 1892.

Witnesses

Inventor
Hugo Cook
by Edward Rector
his Attorney.

UNITED STATES PATENT OFFICE.

HUGO COOK, OF DAYTON, OHIO.

CASH REGISTER AND INDICATOR.

SPECIFICATION forming part of Letters Patent No. 483,511, dated September 27, 1892.

Application filed February 12, 1892. Serial No. 421,289. (No model.)

*To all whom it may concern:*

Be it known that I, HUGO COOK, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention relates to a printing attachment for such machines for printing both detached checks and a permanent record; and its novelty will be herein set forth, and specifically pointed out in the claims.

In the accompanying drawings, Fig. 3ª, a vertical section of the cam-disk for operating the impression-platen.

The same letters of reference are used to indicate identical parts in all the figures.

Inasmuch as the novelty of my invention resides entirely in the printing attachment, I shall describe only so much of the remainder of the machine as may be necessary to explain the operation of this attachment.

The general construction of the machine, so far as here shown, is substantially the same as that shown and described in Letters Patent of the United States No. 464,294, granted me December 1, 1891, to which patent reference may be had for more detailed illustration and description of the various parts.

Figure 1:
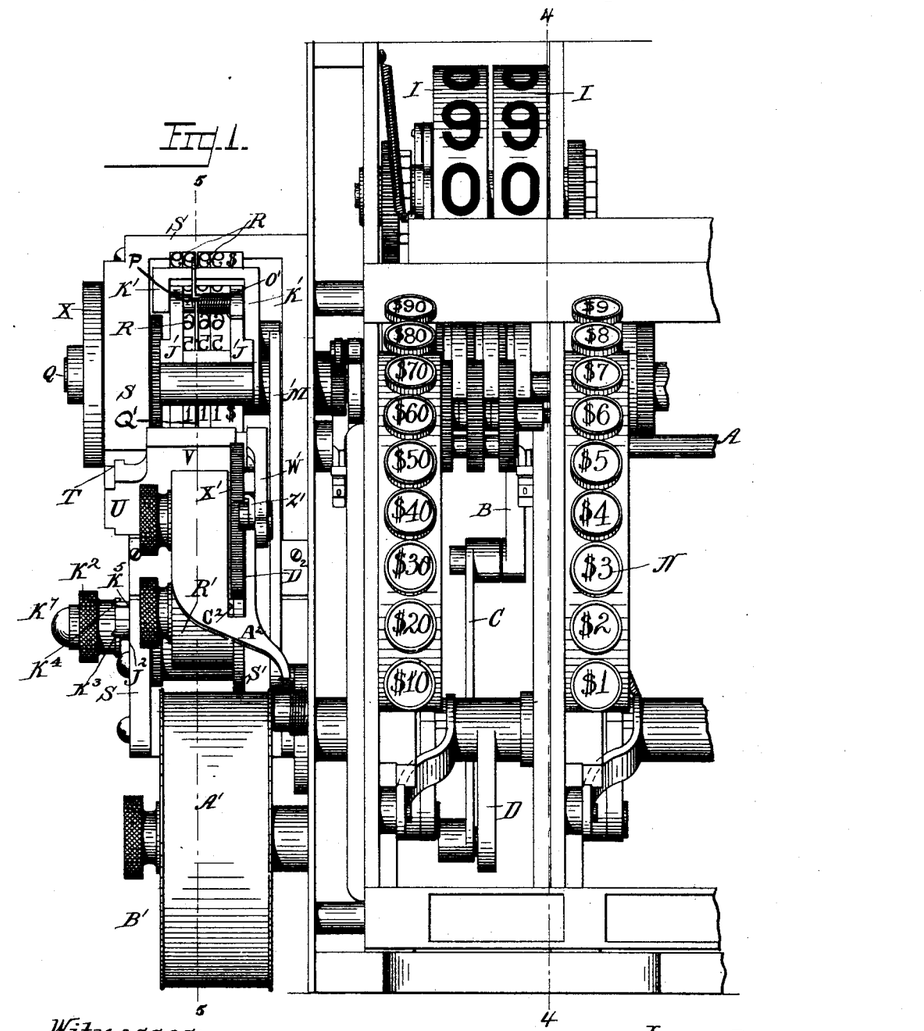
Figure 1 represents a front elevation of one-half of a cash-register of familiar construction, having my invention applied thereto.
Figure 2:
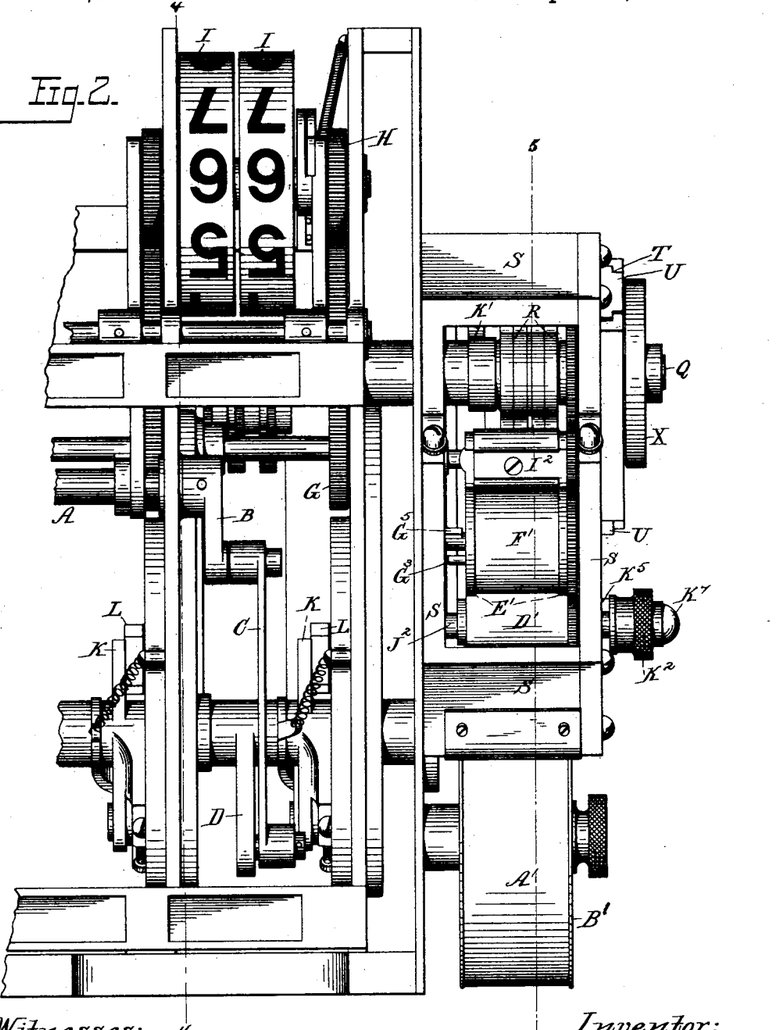
Fig. 2, a rear elevation of the same.
Figure 4:
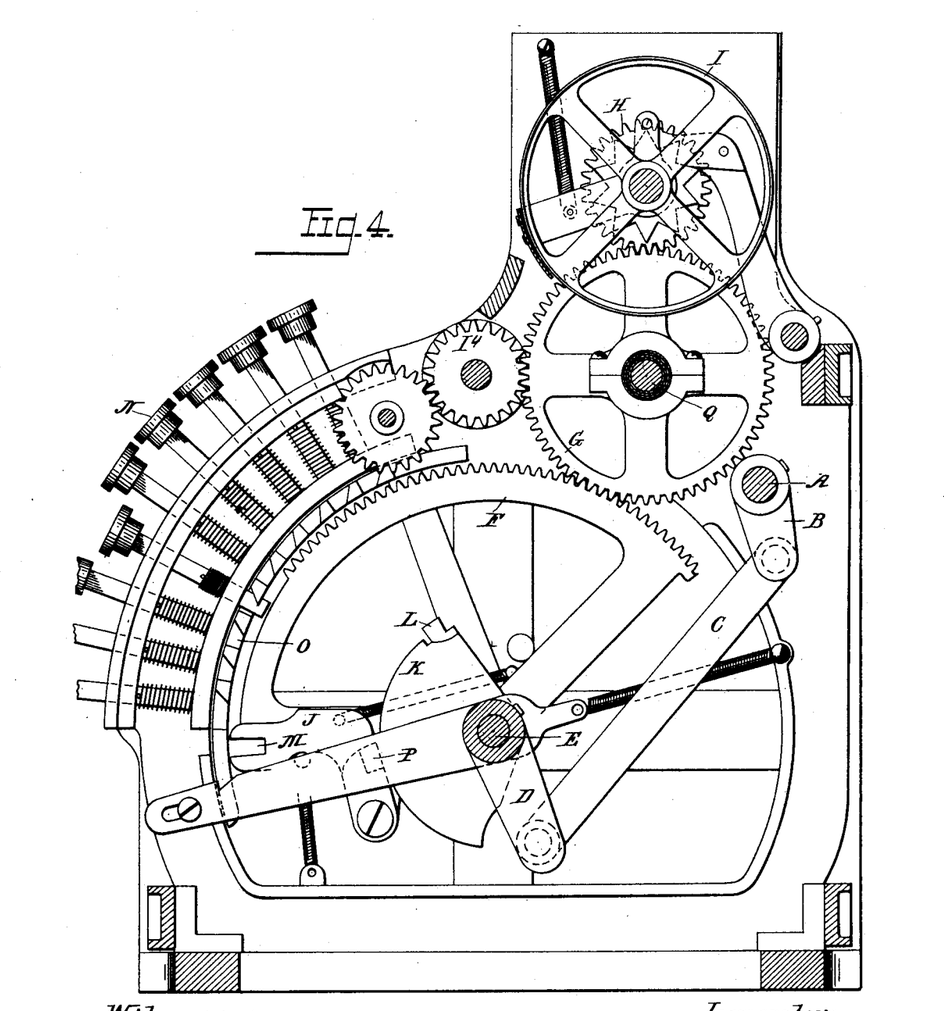
Fig. 4, a vertical section of the same on the line 4 4 of Figs. 1 and 2.

The main driving-shaft of the machine is a revoluble shaft A, Figs. 1, 2, and 4, upon whose right-hand end (not shown) may be secured a suitable handle for turning it. At its left-hand end the shaft has secured upon it a crank-arm B, which is connected by a link C to a crank-arm D, fast on an oscillatory shaft E. Loosely mounted on the shaft E are four gear-toothed sectors F, only two of which— the left-hand ones—are located in the portion of the machine illustrated in the drawings. Each of these sectors meshes with a gear-wheel G, which in turn meshes with a gear H, fast on the hub of an indicator-wheel I, there being four indicator-wheels in the machine, one geared to each sector, and representing, respectively, units of cents, tens of cents, units of dollars, and tens of dollars. Each of the sectors F carries a pivoted latch-plate J, Fig. 4, which co-operates with a cam K and lug L, fast on the shaft E beside the segment. A mouth M in the outer end of the plate J co-operates with a series of keys N, there being one series of nine keys for each sector and indicator. These keys have notches in their sides near their inner ends and are surrounded by coiled resetting-springs. When any key is pushed in, its notch is engaged by a detent on a plate O, as seen in Fig. 4, and the key held until the plate is moved to release it.

The operation of the latches J and their associated devices is explained at length in my patent before referred to, and it will be sufficient here to state that when a key in any series is pushed in and caught by the detent-plate O, as is the key in Fig. 4, and the shaft A then given one complete revolution, and the shaft E thereby oscillated forward and back, the lug L on the side of the cam K will engage a recess P in the latch-plate J at the end of the forward oscillation of the shaft E, and in the backward movement of the shaft will carry the latch-plate, and consequently the sector, with it until the mouth M at the outer end of the plate engages the inner end of the key, which has been pushed in, whereupon the lug L will be disengaged from the latch-plate J and the shaft E will move on alone, while the latch-plate will be caught upon the key and the sector arrested at that point. The adjustment of the parts is such that when the sectors are in the position of the one seen in Fig. 4 the indicator-wheels I all stand with their zeros exposed at the reading-opening in the casing of the machine. As the sector is carried backward with the shaft E in the manner before explained the indicator-wheel is turned forward from zero, and when the latch-plate J engages the operated key and the sector is arrested the number upon the indicator-wheel which corresponds to the operated key will be exposed at the reading-opening.

The gear-wheels G, which are driven by the sectors F and in turn drive the indicator-wheels I, as well as the registering-wheels I⁴, Fig. 4, are fast upon a series of concentric sleeves mounted upon the shaft Q, Fig. 4. The gear at the extreme right of the machine (not shown) is fast upon the right-hand end of the inner sleeve. The second gear is fast upon the end of the second sleeve. The gear G (shown in Fig. 4) is fast upon the third sleeve, and the next gear to the left, which drives the fourth indicator-wheel, is fast upon the outer sleeve. Upon the extreme left-hand end of these sleeves are secured four type-carriers R, Figs. 1, 3, and 5, each bearing a "0" and a series of nine types, figures representing units from "1" to "9," inclusive. In addition, the right-hand carrier, which is made wider than the others, has a "$" type beside each of its numbers. The extreme left-hand type-carrier and the extreme right-hand gear-wheel G (not shown) are fast upon opposite ends of the inner sleeve, Fig. 10, so that this type-carrier and the indicator-wheel which represents units of cents will turn together. The next type-carrier is fast upon the same sleeve as the second gear-wheel G from the left of the machine, so that this carrier and the indicator-wheel which represents tens of cents will turn together. The third type-carrier from the left is fast upon the same sleeve as the gear-wheel G, (shown in Fig. 4,) so that this carrier and the indicator-wheel which represents units of dollars turn together, while the type-carrier upon the extreme right and the gear-wheel upon the extreme left are fast upon the same sleeve, so that this carrier and the indicator-wheel representing tens of dollars turn together. The arrangement of the parts is such that when a number upon any indicator-wheel is brought to the reading-opening the same number upon the corresponding type-wheel will be brought to the printing-point.

The shaft Q, Fig. 4, is a revoluble one and is geared to the shaft A near the left-hand side of the machine at a point not shown in the drawings. Like the shaft A, it makes a complete revolution at each operation of the machine.

Secured upon the left-hand side of the machine is a framework S, Figs. 1, 2, 3, and 5, within which the type-carriers above mentioned and other associated parts hereinafter described are located. Fitting in an inclined guideway in the outer wall of this framework at T, Figs. 1 and 2, is a sliding bar U, Fig. 3, which carries at its lower end an integral plate V, projecting inward at right angles to the bar U, beneath the type-carriers R, Figs. 1, 3, 5, and 10. This plate V carries, among other things, an impression-platen W, which co-operates with the type-carriers R.

Figure 10:
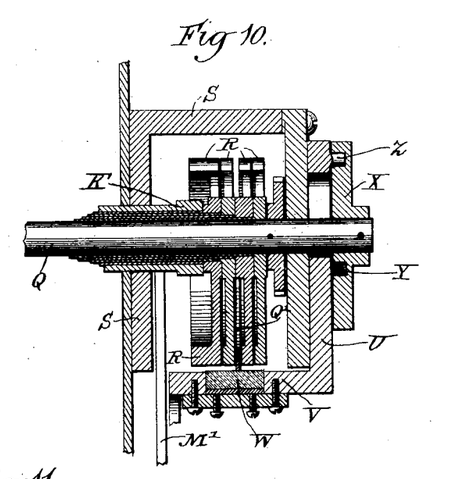
Fig. 10, a detail sectional view on the line 10 10 in Figs. 3 and 5.

Fast upon the outer end of the shaft Q, Figs. 1, 2, 3, and 10, is a disk X, fitting against the outer side of the frame S and sliding bar U. This disk has upon its inner face a cam-groove Y, (shown in dotted lines in Fig. 3 and in solid lines in Fig. 3ª,) in which groove fits a stud Z upon the outer face of the bar U. The result of this is that when the shaft Q and disk X are revolved in the direction of the arrow in Fig. 3 the bar U, Fig. 10, is slid back and forth in its guideway in the frame S and the plate V and impression-platen W moved away from and toward the type-carriers R.

Figures 5, 6, 7, 8, 9:
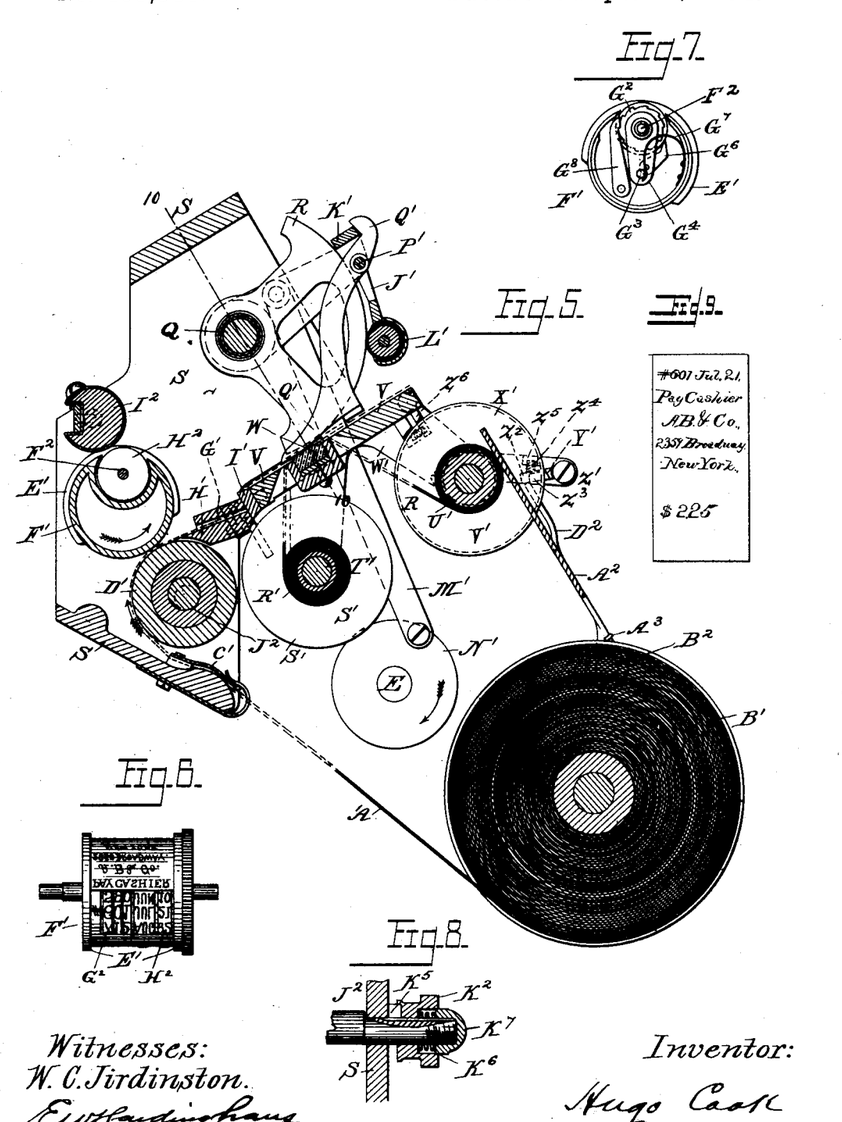
Fig. 5, a vertical section of the check-printing attachment on the line 5 5 of Figs. 1 and 2.
Fig. 6, a view of one side of the printing-cylinder, showing the consecutive numbering and dating wheels carried therein.
Fig. 7, an end view of the printing-cylinder with the head of the cylinder removed to show the actuating-pawl for the consecutive numbering-wheels, the lug on the frame, which co-operates with the pawl, being shown in section.
Fig. 8, a vertical longitudinal section through the shaft, thumb-piece, &c., for one of the feed-rollers.
Fig. 9, a face view of one of the printed checks.

The paper strip A', from which the checks are cut, is carried on a reel B', from which it is led rearward and upward beneath spring-clips C' on the frame S, Fig. 5, thence between a feed-roller D' and the flanges E' of a cylinder F', which bear against the feed-roller, as seen in Fig. 2, thence forward through a guide-chute between an upper plate G' and lower plate H', and thence forward over the plate V and platen W beneath the type-carriers R. In Fig. 5 the plate V is in nearly its uppermost position, with the platen W nearly in contact with the type-carriers R, having been lifted to this position by the cam-groove Y in the disk X, acting upon the stud Z of the bar U. The plate V carries at its rear edge a shearing block or knife I', Fig. 5, which co-operates with the forward edge of the plate G' to sever the paper strip and form the detached check. In Fig. 5 the parts are shown in the position which they occupy when the operating-handle of the machine is in its normal position of rest. During the early part of the operation of the machine, as the handle moves forward from normal position the plate V is lowered away from the type-carriers, so that the paper strip can then be fed over it from the chute between the plates G' H', and as the handle comes on around to normal position again after the type-carriers have been moved in the manner heretofore described to bring to the printing-point their numbers which correspond to the operated keys the cam-groove in the disk X lifts the bar U and plate V again, causing the block I' on the rear edge of the plate to shear off the check from the paper strip and the platen W to press it against the types to effect the printing. After the check has been severed from the strip and printed it is removed from the machine by hand, as hereinafter referred to, the forward end of the check being within easy reach of the operator at the edge of the plate V.

Figure 3:
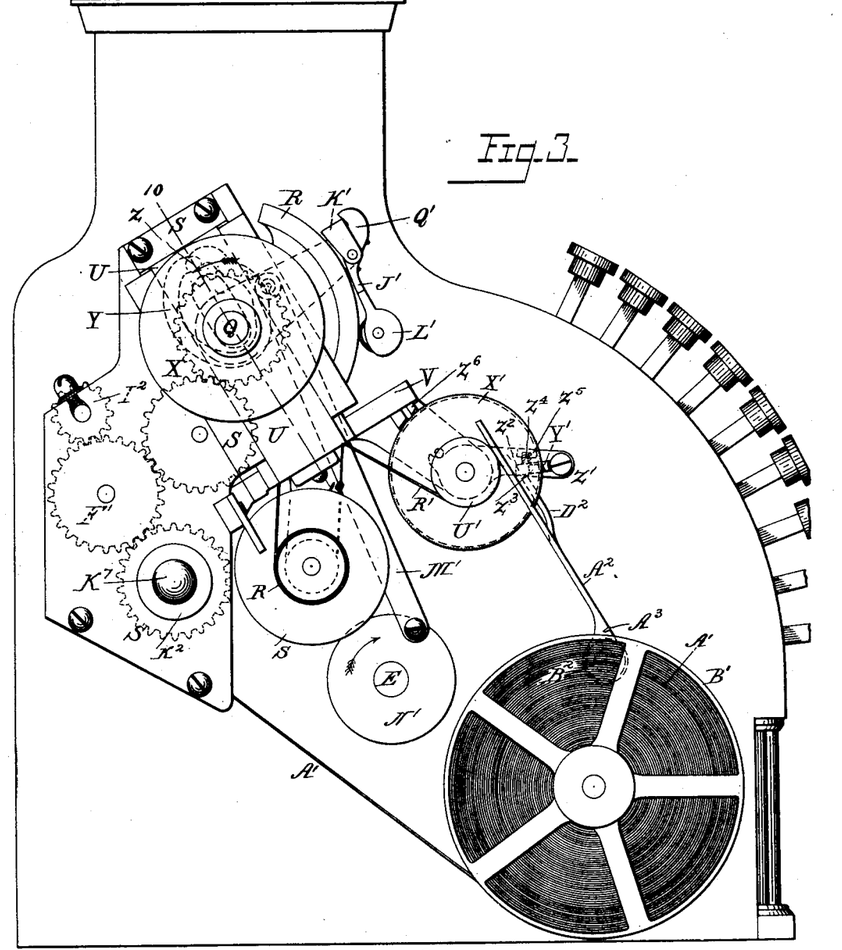
Fig. 3, a side elevation of the same.

The feed-roller D' and flanged cylinder F' are driven by a train of gears from the shaft Q, as shown in Figs. 2 and 3, the uppermost one of which gears is fast upon said shaft just inside the outer wall of the frame S. The flanges E' on the cylinder F' are cut away for a portion of their circumference, as seen at the lower side of the cylinder in Fig. 5. The check-strip will be fed along only while the flanges E' bear against the feed-roller, so that when these cut-away spaces come opposite the feed-roller the movement of the strip ceases. The adjustment of the parts is such that they come opposite the feed-roller just before the shearing-block I' in the upward movement of the plate V reaches the plate G' to shear off the check. While the check is being severed and printed, the check-strip remains at rest, and it does not begin to move again until the next operation of the machine has advanced far enough to lower the plate V and carry the block I' below the plates G' H'.

Hung by arms J' in a swinging frame K', carried by a sleeve fitting over the type-carrier sleeve, Fig. 10, is an inking-roller L', Fig. 5, arranged to travel over the faces of the type-carriers to ink the type. To the supporting side arm of the frame K' is pivoted the upper end of a link M', whose lower end is pivoted to the outer side of a disk N', fast upon the end of the oscillatory shaft E, Fig. 4, heretofore described. It will be remembered that at each complete revolution of the driving-shaft of the machine the shaft E' is oscillated forward and backward. As the shaft E and the disk N' oscillate forward in the direction of the arrow in Fig. 5 the link M' draws the frame K' downward and moves the inking-roller L' over the face of the types. During the backward oscillation of the shaft E and disk N' the type-carriers are set at the proper numbers, the frame K' and inking-roller lifted to normal position again, and the impression-platen brought up to effect the printing, as before described. A spring O', Fig. 1, coiled around the shaft P', by which the arms J' are hung to the frame K', and bearing at one end against one of the arms J', yieldingly presses the inking-roller against the faces of the type-carriers.

Hung upon the shaft P' is a thin arm or plate Q', which fits between two of the type-carriers and has its lower end extended downward and rearward over the platen W. One end of the spring O', above described, bears against the upper end of this arm, as seen in Fig. 1, and tends to press it rearward and throw its lower end downward. When the plate V and platen W are lowered at the beginning of the operation of the machine, the spring O' throws the upper end of the arm Q' slightly rearward until it is arrested by the cross-bar of the frame K'. This causes the lower end of the arm Q' to project below the type-carriers R, so that as the plate V is lifted during the second half of the operation of the machine, the end of the paper strip which projects over the plate is caught between the arm Q' and the platen W before or at the time the check is severed from the strip by the block I' and plate G', and the detached check is then held from displacement by the arm Q' until the printing is effected, said arm being pressed upward against the resistance of the spring O' as the platen is lifted to the position shown in Fig. 5.

Figures 11, 12:
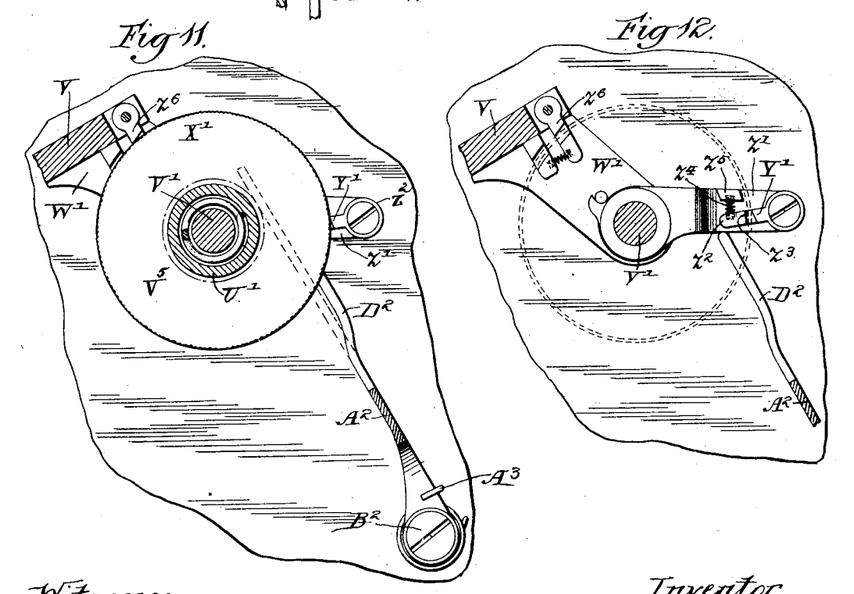
Fig. 11, a sectional detail of the actuating and regulating device for the storage-reel.
Fig. 12, a corresponding view of the same, with the disk of the reel shown in dotted lines to expose the parts beyond it.

In addition to the printing of the detached checks, I provide for the printing of each amount upon a permanent record-strip R'. This strip, which, for convenience, may be narrower than the check-strip, is carried upon a supply reel or spool S', loose upon a shaft T', carried by a support depending from the plate V. From the spool S' the strip is led up through an opening in the plate V, Fig. 5, thence forward over the platen W, thence down through a second opening in the plate, and thence forward around a storage-spool U', loosely mounted upon a shaft V', carried by a support W', projecting forward and downward from the plate V. One flange or disk X' of the spool U' has a toothed or milled edge, with which co-operates a pawl-tooth Y', carried by an arm Z', hung on the shaft V', Figs. 3, 5, 11, and 12. The pawl-tooth itself is upon a short arm $Z^2$, pivoted to the outer end of the arm Z'. A lug $Z^3$ on the arm $Z^2$ fits against the inner face of a flange on the disk X', (indicated by the dotted lines in Figs. 5 and 12,) the flange being embraced by the tooth Y' and lug $Z^3$ and permitting a very limited play of the arm $Z^2$ upon its pivotal support. A spring $Z^4$, confined in a recess in a lug $Z^5$ on the side of the arm Z', bears at its lower end against the upper side of the arm $Z^2$ and yieldingly holds the tooth Y' in engagement with the edge of the disk X'. Whenever the arm Z' is swung upward the tooth Y' will carry the disk X' with it, turning the spool U', and drawing the check-strip R' from the spool S' over the platen W and winding it on the spool U'. During the downward movement of the arm Z' the spring $Z^4$ permits the tooth Y' to slip over the edge of the disk X', and a pawl $Z^6$, carried by the frame V and spring-pressed against the edge of the disk at its opposite side, prevents any backward movement of it.

The arm Z' is swung up and down to turn the disk X' in the following manner and by the following means: A plate $A^2$, pivoted at its lower end to the side of the machine at $B^2$, bears at its upper end against the record-strip wound on the spool U', a spring $A^3$ at its lower end yieldingly holding it there. This plate has in it a slot $C^2$, Fig. 1, which embraces the disk X' and forms an arm $D^2$ of the right-hand edge of the plate. This arm is cut off or made shorter than the main body of the plate and in the drawings is shown bent slightly forward out of the plane of the body of the plate. The arm Z′, which carries the pawl-tooth Y′, rests upon the upper end of this arm D², Fig. 12, of the plate A². It results from this that when the plate V is lowered at the beginning of the operation of the machine the pivotal support V′ of the inner end of the arm Z′ will be lowered, while the outer end of the arm will be held up by the arm D² of the plate A², so that the pawl-tooth Y′ will turn the disk X′ and spool U′. When the plate V is lifted again near the end of the operation of the machine, the inner end of the arm Z′ is raised again and the arm resumes the position shown in the drawings, a spring V⁵, Fig. 11, coiled around the shaft V′ and secured at one end to the shaft and at its other to the arm Z′, constantly pressing the latter against the upper end of the arm D². It will thus be seen that at each operation of the machine the lowering and raising of the plate V causes the spool U′ to be turned and the record-strip R′ to be drawn from the spool S′ over the platen W and wound upon the spool U′.

The main purpose of the plate A² and arm D² is to regulate the feed of the record-strip, since for the operation so far described a fixed stop supporting the outer end of the arm Z′ would be sufficient. As the record-strip is drawn from the spool S′ and wound on the spool U′ and the size of the roll upon the latter spool gradually increases, it is evident that if the spool continues to be turned the same portion of a revolution at each operation of the machine a gradually-increasing portion of the strip will be drawn from the spool S′ and wound upon the spool U′ at each operation and the record-numbers will be printed farther and farther apart upon the strip. I overcome this difficulty and maintain a regular and even feed of the strip by means of the co-operation of the plate A² and its arm D² with the roll upon the spool U′ and with the pawl-carrying arm Z′. It will be seen that the lower down and the nearer the shaft V′ the point of engagement of the arms D² and Z³ is, the greater will be the movement of the outer end of the arm Z′ relatively to the edge of the disk X′ at each operation of the machine, and the higher up and farther away from the shaft V′ such point of engagement is the less will be such movement of the arm Z′. It will also be seen that as the quantity of the paper strip wound upon the spool U′ increases the plate A² will be gradually moved forward and the point of engagement of the arms D² and Z′ gradually moved upward and farther away from the shaft V′, upon which the arm Z′ is pivoted. The result is that the gradually-increasing size of the roll upon the spool U′ causes a gradually-decreasing movement of the spool, and thus substantially the same length of strip will be wound upon the spool at each operation of the machine, whether the spool be nearly empty or nearly filled.

Figure 3A:
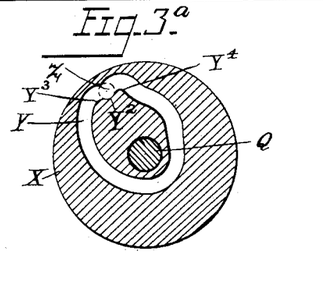

The printing of the amount upon the record-strip by the types on the carrier R is not effected simultaneously with the printing of it upon the check-strip, but at the beginning of the next operation of the machine, after the detached check has been removed by hand. As seen in Figs. 3 and 3ᵃ, when the parts are in their normal position of rest the stud Z on the bar U rests in a slight depression of the groove Y at Y². The bar U has been lifted to its highest position and the printing effected by the passage of the point or cam Y³ under the stud Z, and as the depression at Y² came under the stud the bar U has been slightly lowered again, thereby releasing the check which had been printed and permitting it to be drawn out. This has left the record-strip R′ immediately below the types, and as the disk X is turned forward at the beginning of the next operation of the machine the depression Y² in the groove is carried from under the stud Z and the higher point or cam Y⁴ engages it and lifts the bar U and plate V again and the platen W presses the record-strip R′ against the types to effect the printing. It will thus be seen that at each operation of the machine the amount indicated, registered, and printed upon the check-strip at the preceding operation is first printed on the record-strip. Then as the platen is lowered away from the types the record-strip is fed along and a blank space upon it brought to the printing-point, the end of the check-strip being at the same time fed along to the printing-point over the record-strip. Then the amount corresponding to the operated keys is indicated and registered and the type-carriers moved to the proper positions to print that amount. Then the platen carries the check-strip up against the types to effect the printing of the amount upon it, and then as the parts come to rest in normal position the platen is slightly lowered from the types to release the printed check and it is drawn out by hand.

In addition to printing upon the check-strip and record-strip the amount of each sale indicated and registered, I provide means for printing upon each check its consecutive number, date, and such other matter as may be desired. In the center of a cylindrical recess in the cylinder F′, Fig. 5, is mounted a shaft F², extending the length of the cylinder and supported at its ends in the heads thereof. Upon this shaft are mounted a series of consecutive numbering-wheels G², Fig. 6, and a series of dating-wheels H², the former actuated automatically to cause the primary wheel of the series to be turned one number at each operation of the machine, and the latter adapted to be set by hand in the usual manner. Owing to the relatively-small diameter of these numbering and dating wheels only one longitudinal row of their types project at one time far enough outward to have their faces flush with the edges of the flanges E′, so that only the one row can make an impression when the cylinder F′ is given a revolution and the types brought against the surface of the roller D', the latter roller acting as an impression-roller in its co-operation with the types carried by the cylinder F' and as a feed-roller in its co-operation with the flanges E' of the cylinder F', as heretofore described. Adjacent to the cylindrical recess, which contains the type-wheels G² H², I place upon the surface of the cylinder F' such type-matter as may be desired—in this instance "A. B. & Co., 2359 Broadway, New York. Pay Cashier," while immediately to the left of the consecutive numbering-wheels in the printing-line I place either "No." or the sign "#" to designate "number."

When the machine is at rest, with its various parts in normal position, the type-wheels in the cylinder F' are at the upper side of the cylinder and the fixed type-matter is upon the forward side of the cylinder. The number, date, and other matter have been printed upon the front end of the check-strip A', which now rests upon the plate G', ready to be fed forward at the next operation of the machine. At such next operation the strip is fed forward with this printed matter upon it, the type-carriers R and platen W print the amount of the sale upon it behind the other printed matter, and the check is cut off by the shearing-block, while at the same time the cylinder F' has made another complete revolution and printed its matter upon the check which is to be issued at the next succeeding operation of the machine. Thus at the end of each operation of the machine there is a partially-printed check on hand ready to be fed forward and severed from the strip and have the amount of the next sale printed upon it. One of the printed checks as it is delivered from the machine is shown in Fig. 9.

An inking-roller I² for the type upon the cylinder F' is journaled at its ends in the frame S and geared to the cylinder, as seen in Figs. 2 and 3.

The set of consecutive numbering-wheels G² may be of the usual or any suitable construction and the primary wheel of the set may be actuated at each operation of the machine in any convenient manner. In the present instance a pin G³, carried by the pawl-arm G⁴, as seen in Fig. 7, co-operates with a cam-lug G⁵ upon the framework, Fig. 2. The pin G³ of the pawl-arm rides over the cam G⁵ at each revolution of the machine, thereby rocking the pawl-arm and causing the pawl G⁶ to advance the primary wheel one number. A spring G⁷ resets the pawl-arm after the pin G³ has passed the cam G⁵ on the frame. A pawl G⁸ prevents backward movement of the wheels.

It may not be desirable at all times to feed out and print a check at each operation of the machine, and for that reason I provide means for throwing the feeding devices for the check-strip into and out of operation at will. The feed-roller D' is loosely mounted upon a shaft J², which is eccentrically journaled in the frame S, as indicated by the dotted line of one of its bearings in Fig. 5 and as seen in Fig. 8. The shaft J² projects outside the frame S, as seen in Figs. 1, 2, and 8, and has splined upon its outer end a thumb-piece K² for turning it. It will be seen that by turning the thumb-piece K² and shaft J² to the left, Figs. 3 and 5, the feed-roller D' will be carried away from the flanged cylinder F', so that the revolution of the roller and cylinder will not feed or print the strip A' passed between them. By turning the thumb-piece K² and shaft J² to the right again the roller D' will be carried back into co-operative relation with the cylinder. As seen in Fig. 1, the base of the thumb-piece K² has in it two notches K³ and K⁴, which co-operate with a lug K⁵ on the side of the framework. Within the thumb-piece is a recess, as seen in Fig. 8, in which recess a spiral sping K⁶ is confined by a nut K⁷, screwed upon the outer end of the shaft J². This spring presses the thumb-piece inward and yieldingly holds one of the notches K³ K⁴ in engagement with the lug K⁵ on the frame. By slipping the thumb-piece outward and turning it until the opposite notch engages the lug K⁵ the feeding devices may be thrown into or out of operation at will. This device is particularly useful where it is desired to print an additional amount upon a check already delivered from the machine. Thus in using the machine in a restaurant, if after a check has been delivered to a customer he give an additional order the attendant will take his check to the machine, depress the proper keys to indicate and register the amount which is to be added to the check, turn the thumb-piece K² backward to throw the feeding-rollers out of operation, place the lower end of the check upon the plate V beneath the type-carriers, and then give the operating-handle a revolution. This will cause the additional amount to be indicated and registered and printed upon the check, and at the beginning of the next operation of the machine it will be printed upon the record-strip. In this manner several additional amounts may be printed upon a check already delivered, if necessary, and each amount will also be duly printed upon the record-strip.

Having thus fully described my invention, I claim—

1. In a printing attachment for cash-registers, the combination of a type-carrier and an impression-platen adapted to have both a check and a record-strip passed between them, means for moving the record-strip between the type-carrier and platen, and two cams co-operating with the platen to produce two distinct impressing movements thereof at each operation of the machine, one for the check and the other for the record-strip.

2. In a printing attachment for cash-registers, the combination of a type-carrier and an impression-platen adapted to have a check and a record-strip passed between them, means for moving the record-strip between the type-carrier and platen, and two revoluble cams co-operating with the platen, one near the beginning of its revolution to produce an impression upon the record-strip and the other near the end of its revolution to produce an impression upon the check.

3. In a printing attachment for cash-registers, the combination of a type-carrier and an impression-platen adapted to have a check and a record-strip passed between them, means for moving the record-strip between the type-carrier and platen, a revoluble disk having a cam-groove therein, provided with two impressing points or cams $Y^3$ $Y^4$ with a depression $Y^2$ between them, and a stud upon the platen-support, fitting in said cam-groove, whereby at each revolution of the disk the platen is given two distinct impressing movements, one by one cam for the record-strip and one by the other cam for the check.

4. In a cash register and indicator, the combination of a driving mechanism having a defined movement at each operation of the machine, a gear-toothed sector mounted to oscillate back and forth, means for connecting the driving mechanism with and disconnecting it from the sector to impart to the latter different portions of the movement of the driving mechanism, a type-carrier geared to the sector, an impression-platen arranged to permit a check and a record-strip to be passed between it and the type-carrier, means for moving the record-strip between the type-carrier and platen, and two cams actuated by the driving mechanism of the machine and co-operating with the platen to produce two distinct impressing movements thereof at each complete movement of the driving mechanism.

5. In a printing attachment for cash-registers, the combination of a revoluble cylinder bearing a series of types and an impression-roller co-operating therewith and adapted to have a check-strip fed between them, a type-carrier and a platen adapted to have the same strip passed between them, means for moving the check-strip between the cylinder and impression-roller and type-carrier and platen, a knife interposed between the printing-cylinder and the type-carrier for severing the strip to form a detached check, and an operating-cam for the platen and knife.

6. In a printing attachment for cash-registers, a revoluble cylinder having a series of consecutive numbering and dating type-wheels eccentrically journaled therein, the former being actuated by the revolutions of the cylinder, fixed type-matter upon the surface of said cylinder adjacent to the said wheels, an impression-roller co-operating with the printing-cylinder and arranged to have a check-strip fed between them, a type-carrier and an impression-platen adapted to have said check-strip passed between them, means for advancing the check-strip, a knife interposed between the printing-cylinder and the type-carrier for cutting the check-strip into detached checks, and an actuating-cam for the knife and impression-platen.

7. In a cash register and indicator, the combination of the type-carrier and the impression-platen adapted to have both a check-strip and a record-strip fed between them, feeding mechanism for the record-strip, actuated at each operation of the machine, separate feeding mechanism for the check-strip, and means for throwing it out of and into operation at will, whereby the feeding of the check-strip may be discontinued when desired and the types caused to print upon the record-strip alone.

8. In a cash register and indicator, the combination of the type-carriers and the impression-platen adapted to have both a check-strip and a record-strip fed between them, two cams co-operating with the platen to produce two distinct impressing movements thereof, one for the record-strip and the other for the check-strip, feeding mechanism for the record-strip, actuated at each operation of the machine, and separate feeding mechanism for the check-strip and means for throwing it out of and into operation at will, whereby the feeding of the check-strip may be discontinued when desired and the types caused to print upon the record-strip alone.

9. In a printing attachment for cash-registers, the combination, with the type-carriers and the impression-platen, of two feed-rollers for feeding the check-strip between the carriers and platen, one of said rollers being movable out of and into co-operative relation with the other roller, whereby the feeding of the check-strip may be discontinued and resumed at will.

10. In a printing attachment for cash-registers, the combination, with the type-carriers and the impression-platen, of two feed-rollers for feeding the check-strip between the carriers and platen and an eccentrically-journaled shaft upon which one of said rollers is journaled, whereby upon turning said shaft said roller may be moved away from the other and the feeding of the check-strip discontinued.

11. In a printing attachment for cash-registers, the combination, with the type-carriers and the impression-platen, of two feeding-rollers for feeding the check-strip between the carriers and platen, an eccentrically-journaled shaft upon which one of said rollers is journaled, a thumb-piece splined on the outer end of said shaft and provided with two notches, a stop upon the frame, co-operating with said notches, and a spring applied to the thumb-piece to yieldingly hold the notches in engagement with the stop, whereby upon sliding the thumb-piece upon the shaft until its engaged notch is disengaged from the stop and then turning it until the other notch engages the stop the feed-roller carried by said shaft will be moved out of co-operative relation to the other roller, and vice versa.

12. In a printing attachment for cash-registers, the combination of the type-carriers, a reciprocating platen co-operating therewith, a supply-reel and a storage-reel for the record-strip, both carried by the platen-support and moving with the platen, and means actuated by the reciprocations of the platen to turn the storage-reel and wind up the record-strip.

13. In a printing attachment for cash-registers, the combination of the type-carriers, a reciprocating platen co-operating therewith, a supply-reel and a storage-reel for the record-strip, both carried by the platen-support, and means for turning the storage-reel, actuated by the reciprocations of the platen-support and controlled by the increasing size of the roll upon the reel to gradually decrease the extent of movement given the latter at each operation of the machine.

14. In a printing attachment for cash-registers, the combination of the type-carriers, a reciprocating platen co-operating therewith, a supply-reel and a storage-reel for the record-strip, both carried by the platen-support, an actuating-pawl for the storage-reel, operated by the reciprocations of the platen-support, and means controlled by the increasing size of the roll upon the storage-reel for gradually decreasing the throw of the pawl.

15. In a printing attachment for cash-registers, the combination, with the storage-reel, a swinging arm hung on the axis of the reel, a pawl carried by said arm and co-operating with the reel to turn the same, a movable stop for the pawl-arm, co-operating with the roll of paper on the storage-reel and gradually moved away from the axis of the reel as the size of the roll increases to cause the stop to engage the pawl-arm farther and farther from its pivotal support, and thereby decrease the throw of the pawl.

16. The combination of the type-carriers R, the platen W, co-operating therewith, the swinging frame K', and the arm Q', hung therein and co-operating with the platen W, substantially as described.

17. The combination of the type-carriers R, the sliding bar U, having the stud Z, the revoluble disk X, having the cam-groove Y, co-operating with the stud Z, the plate V, carried by the bar U, the platen W, and the record-strip reels S' and U', carried by the plate V, substantially as described.

18. The combination of the type-carriers R, the revoluble disk X, having the cam-groove Y, the sliding bar U, having the stud Z fitting in the cam-groove Y, the plate V, carried by the bar U, the platen W, and the knife I', carried by the plate V, and the fixed plate G', co-operating with the knife I', substantially as described.

19. The combination of the type-carriers R, the revoluble disk X, having the cam-groove Y, the sliding bar U, having the stud Z fitting in the groove Y, the plate V, carried by the bar U, the platen W, and the knife I', carried by the plate V, the fixed plates G' and H', the supply-reel B' for the check-strip, and the roller D', and flanged cylinder F', between which and beneath the plate G' the check-strip is led from the reel B' to the plate V, substantially as described.

20. The combination of the roller D', the cylinder F', having the type-wheels $G^2$ $H^2$ eccentrically journaled therein, the type-carriers R, the revoluble disk X, having the cam-groove Y, the sliding bar U, having the stud Z fitting in the groove Y, the plate V, carried by the bar U, the platen W, and the knife I', carried by the plate V, and the fixed plate G', co-operating with the knife I', substantially as described.

21. The combination of the type-carriers R, the reciprocating plate V, carrying the platen W and the record-strip rollers S' and U', the arm Z', hung on the axial support of the roller U', the pawl Y', carried by the arm Z' and co-operating with the disk X' of the reel U', and the plate $A^2$, bearing against the roll of paper on the reel U' and having an arm $D^2$ engaging the pawl-arm Z', substantially as described.

HUGO COOK.

Witnesses:
 THOMAS CORWIN,
 EDWARD RECTOR.